(12) United States Patent
McNeil et al.

(10) Patent No.: US 9,242,684 B2
(45) Date of Patent: *Jan. 26, 2016

(54) METHOD AND APPARATUS FOR MAKING GALVANIZED UPPER COUPLER ASSEMBLY

(71) Applicant: Great Dane Limited Partnership, Chicago, IL (US)

(72) Inventors: Jerry Woodson McNeil, Naples, FL (US); Richard Bordeaux Mullininx, Savannah, GA (US)

(73) Assignee: GREAT DANE LIMITED PARTNERSHIP, Chicago, IL (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/886,460

(22) Filed: May 3, 2013

(65) Prior Publication Data

US 2013/0241178 A1 Sep. 19, 2013

Related U.S. Application Data

(63) Continuation of application No. 12/703,436, filed on Feb. 10, 2010, now Pat. No. 8,485,544.

(60) Provisional application No. 61/214,242, filed on Apr. 21, 2009.

(51) Int. Cl.
*B62D 53/08* (2006.01)
*C23C 2/02* (2006.01)
*C25D 5/02* (2006.01)
*C25D 7/00* (2006.01)
*B05D 1/32* (2006.01)
*B62D 65/02* (2006.01)

(52) U.S. Cl.
CPC .............. *B62D 53/0842* (2013.01); *B05D 1/32* (2013.01); *B62D 53/08* (2013.01); *B62D 65/02* (2013.01); *C23C 2/02* (2013.01); *C25D 5/022* (2013.01); *C25D 7/00* (2013.01); *Y10T 29/49982* (2015.01)

(58) Field of Classification Search
CPC ...... B62D 53/06; B62D 53/0842; C23C 2/02; C25D 5/022; B05D 1/32
USPC ............... 280/433, 423.1, 789; 427/282, 433; 428/659

See application file for complete search history.

(56) References Cited

U.S. PATENT DOCUMENTS

| | | |
|---|---|---|
| 2,897,588 A | 8/1959 | Chapman |
| 3,091,501 A * | 5/1963 | Satrum .................. 384/593 |
| 3,149,987 A | 9/1964 | Crandall |
| 3,612,569 A | 10/1971 | Marinelli |

(Continued)

OTHER PUBLICATIONS

Office Action dated Jun. 5, 2014 for U.S. Appl. No. 13/677,981.

(Continued)

*Primary Examiner* — Anne Marie Boehler
(74) *Attorney, Agent, or Firm* — Nelson Mullins Riley & Scarborough, LLP

(57) ABSTRACT

A method of making a galvanized upper coupler assembly for use in a trailer and the corresponding upper coupler assembly apparatus is disclosed. The method comprises the steps of providing a frame, covering at least one area of the frame with a mask, galvanizing the portions of the frame that are not covered, removing the mask, providing a kingpin, and attaching the kingpin to the frame. After attachment of the kingpin to the frame, the combined assembly can be coated with a rust resistant coating if desired, a cover plate can be attached to the frame, over the kingpin.

30 Claims, 11 Drawing Sheets

(56) References Cited

U.S. PATENT DOCUMENTS

| | | |
|---|---|---|
| 3,633,941 A | 1/1972 | Pleier |
| 3,990,720 A | 11/1976 | Schwartz |
| 4,946,184 A | 8/1990 | Larocco |
| 6,623,868 B1 | 9/2003 | Shindou et al. |
| 2007/0007794 A1 | 1/2007 | Bertoch et al. |
| 2007/0194564 A1 | 8/2007 | Garceau et al. |
| 2007/0210614 A1 | 9/2007 | Chandler |
| 2008/0202211 A1 | 8/2008 | Wetzig |
| 2008/0258429 A1 | 10/2008 | Lefebvre |
| 2009/0020577 A1 | 1/2009 | Johnson et al. |
| 2009/0049673 A1 | 2/2009 | Xammar |
| 2009/0224512 A1 | 9/2009 | Winter et al. |
| 2010/0148475 A1 | 6/2010 | Serre |

OTHER PUBLICATIONS

Office Action dated Jun. 5, 2012 for corresponding U.S. Appl. No. 12/703,436.

Response to Office Action dated Jun. 5, 2012 for corresponding U.S. Appl. No. 12/703,436.

Final Office Action dated Dec. 3, 2012 for corresponding U.S. Appl. No. 12/703,436.

Response to Final Office Action dated Dec. 3, 2012 for corresponding U.S. Appl. No. 12/703,436.

* cited by examiner

US 9,242,684 B2

METHOD AND APPARATUS FOR MAKING GALVANIZED UPPER COUPLER ASSEMBLY

This application is a continuation of U.S. patent application Ser. No. 12/703,436 filed Feb. 10, 2010, now U.S. Pat. No. 8,485,544 which claims the domestic benefit of U.S. Provisional Application Ser. No. 61/214,242 filed on Apr. 21, 2009, which disclosures are hereby incorporated by reference in their entirety.

FIELD OF THE INVENTION

The present disclosure relates to an upper coupler assembly for use with a semi-trailer. More particularly, the present disclosure relates to the configuration and method of making a galvanized upper coupler assembly.

BACKGROUND OF THE INVENTION

Cargo vehicles, such as semi-trailers, van-type trailers, flatbed or platform type trailers, container chassis and cargo containers, are known. Cargo vehicles include articulated vehicles which have a permanent or semi-permanent pivoting joint as part of the vehicle's structure. The forward underbody of a trailer includes an upper coupler assembly having a kingpin configured to couple the trailer to a fifth wheel (also known as a lower coupler) of the tractor.

When in motion, the upper coupler assembly of a trailer is subjected to a spray of road debris from the tractor's tires which may include sand, gravel, ice and snow, as well as the chemicals used to remove snow and ice. This spray of various materials promotes corrosion of the upper coupler assembly which acts on both its external and internal surfaces. Historically, trailer upper coupler assemblies have been coated externally and internally with a variety of well known materials and methods (the usual coatings are alkyd and epoxy paints and "undercoatings" such as sulfonated wax systems or water emulsified asphaltic coatings).

Galvanizing is a well-known method to protect against corrosion. However, the kingpin used in semi-trailers is typically made of alloy steel heat treated by quenching and subsequent tempering to achieve appropriate strength and wear resistance. If subjected to the galvanization process, a kingpin may lose its strength and wear resistance or become subject to hydrogen embrittlement as a result of the plating process.

It is the purpose of this invention to provide a partially galvanized upper coupler, which is also usable with the lower coupler on the truck tractor.

SUMMARY OF THE INVENTION

The present disclosure includes a method of making a partially galvanized upper coupler assembly for use in a trailer. The method comprises the steps of providing a frame, covering at least one area of the frame with a mask, galvanizing the portions of the frame that are not covered by the mask, removing the mask, providing a kingpin, and attaching the kingpin to the frame. After attachment of the kingpin to the frame, the combined assembly can be coated with a rust resistant coating. If desired, a cover plate can be attached to the frame, over the kingpin.

The present disclosure also includes an upper coupler assembly for a trailer. The upper coupler assembly comprises a frame including a wall having an upper surface, a lower surface, and an aperture extending therethrough, and a kingpin received in the aperture. The intersection of the kingpin and the wall define an upper surface area adjacent the kingpin and a lower surface area adjacent to the kingpin. The upper surface is substantially covered with a galvanizing coating, leaving the upper surface area uncovered by the galvanizing coating.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
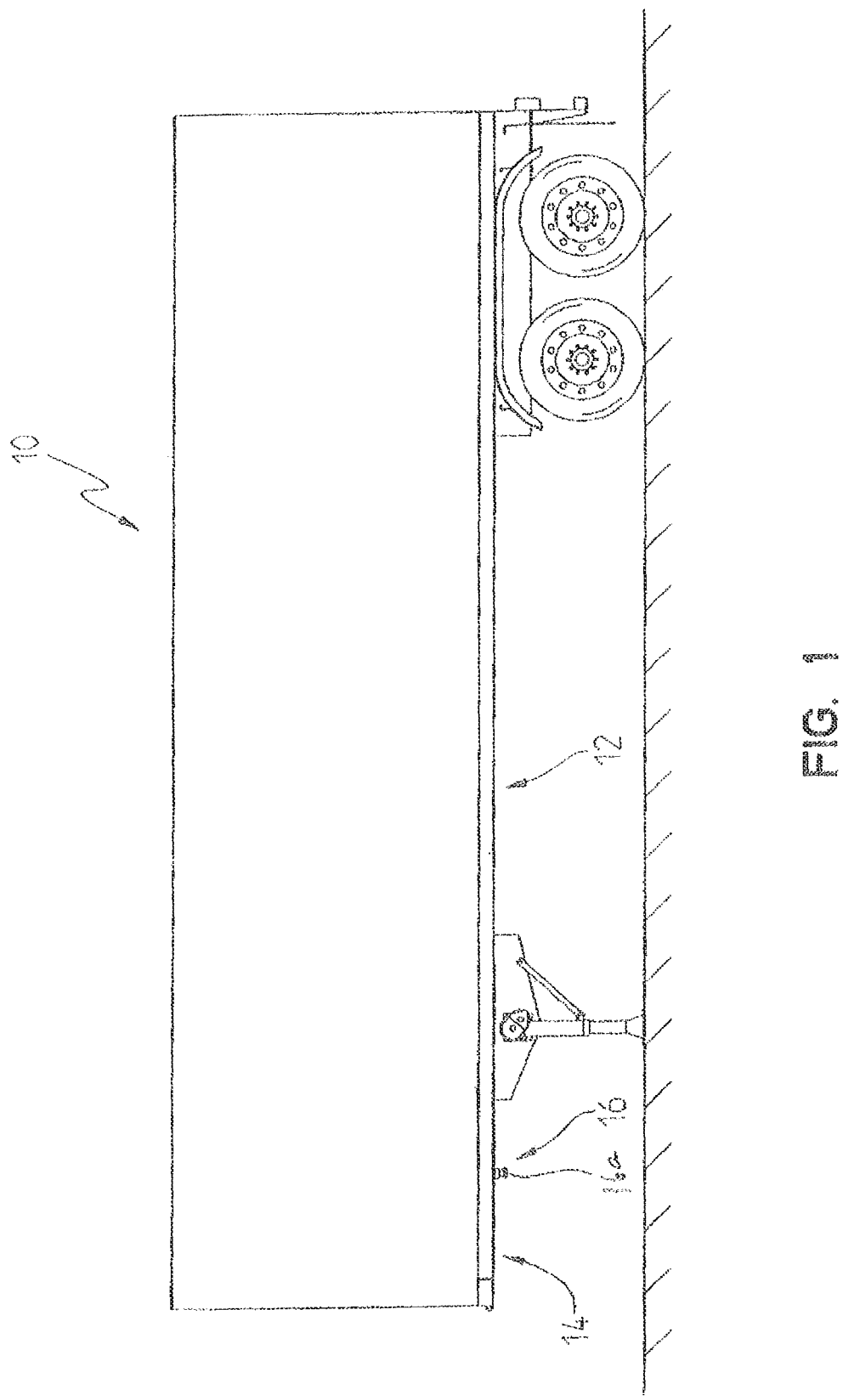
FIG. 1 is a side elevational view of a semi-trailer having an upper coupler assembly employing features of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE EXEMPLARY EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a cargo vehicle or trailer 10 having a floor assembly 12 which includes upper coupler assembly 14 in the forward section. The upper coupler assembly 14 includes a kingpin 16 and a frame 18 and may include a cover plate 20. As known in the art, a spool 16a of the kingpin 16 projects from the underside of the floor assembly 12 and is positioned to engage a tractor's fifth wheel or lower coupler (not shown).

Figure 2:
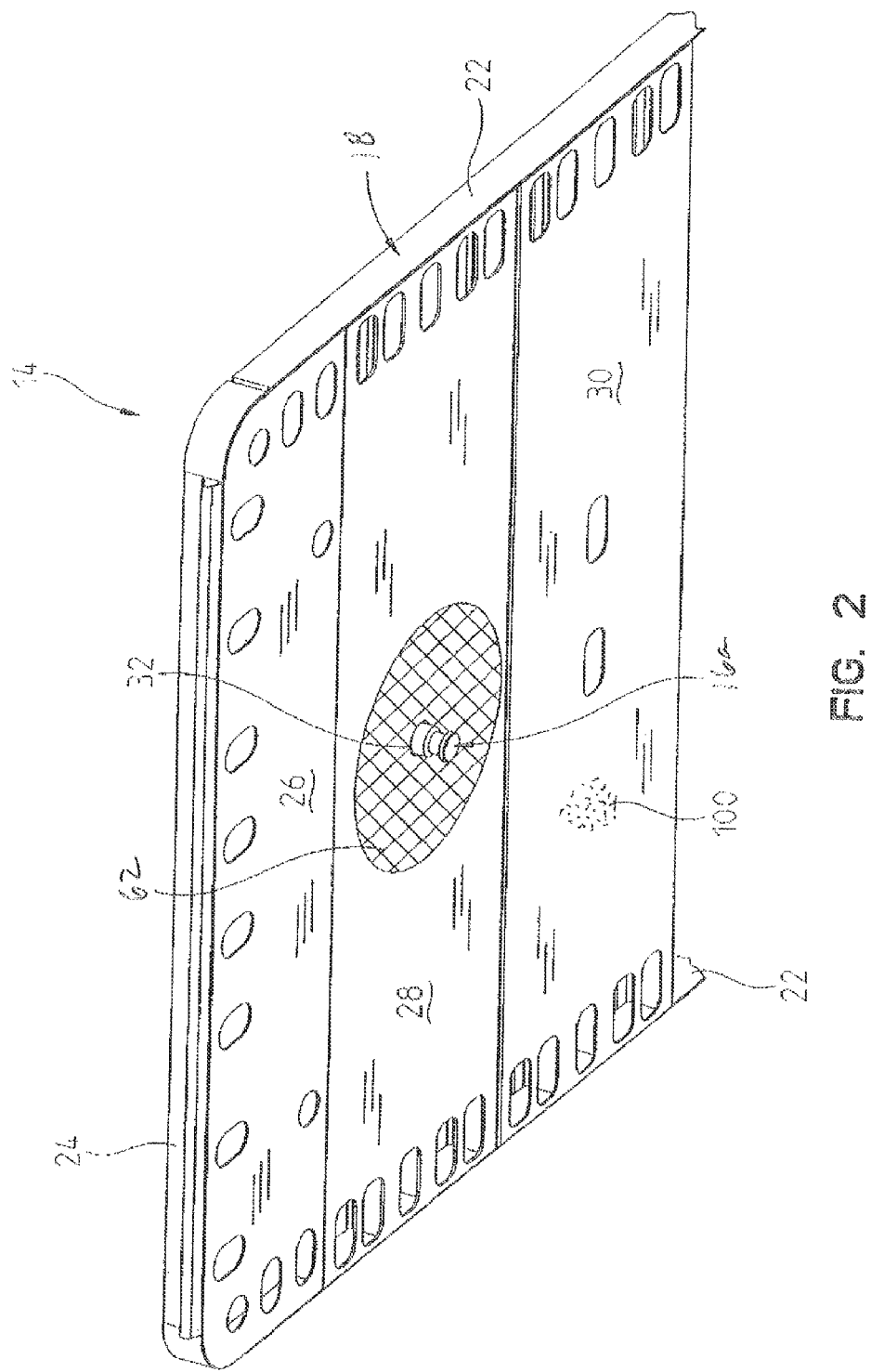
FIG. 2 is a lower perspective view of the upper coupler assembly shown in FIG. 1.
Figure 3:
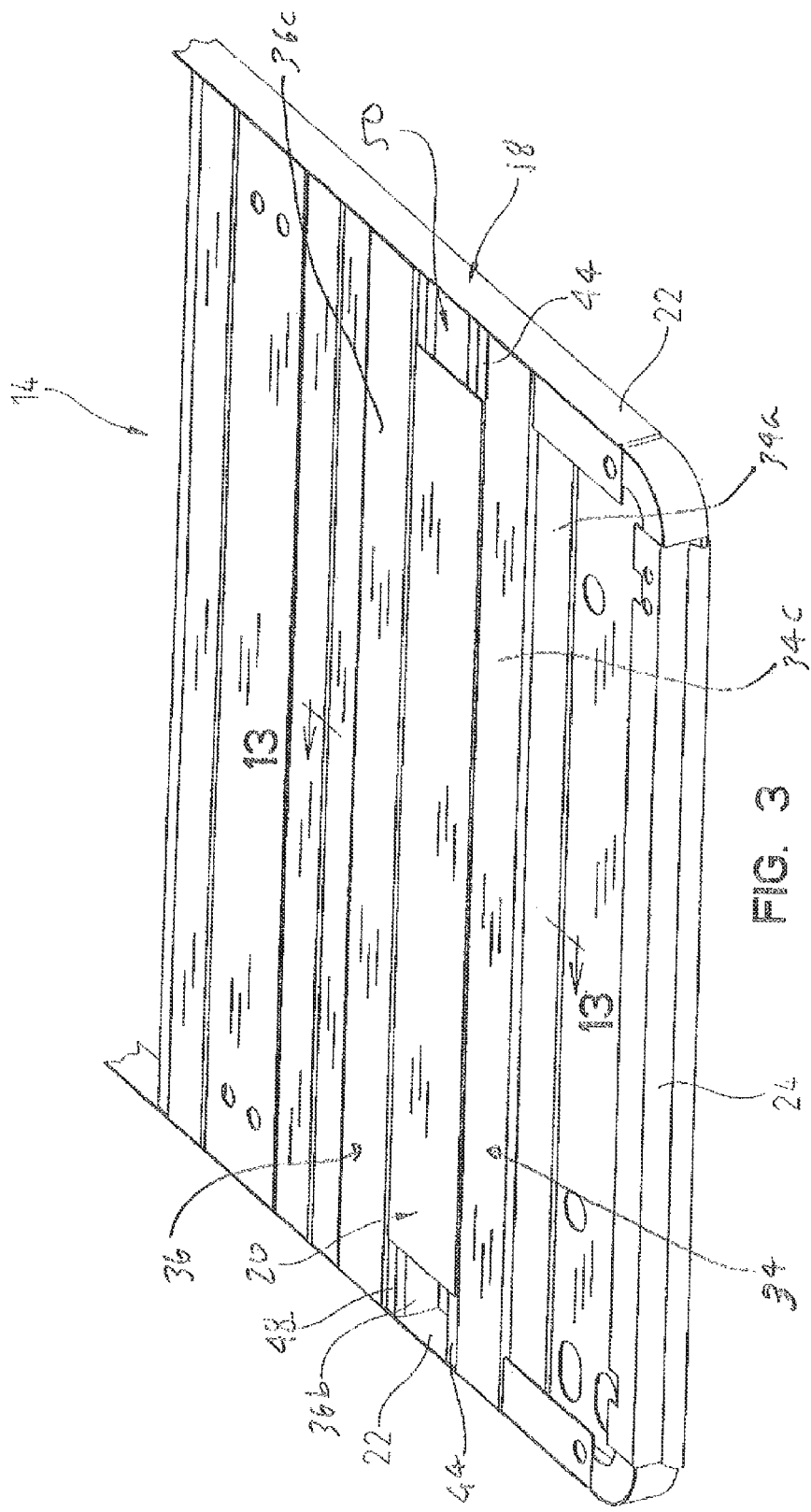
FIG. 3 is an upper perspective view of the upper coupler assembly of FIG. 2.
Figure 4:
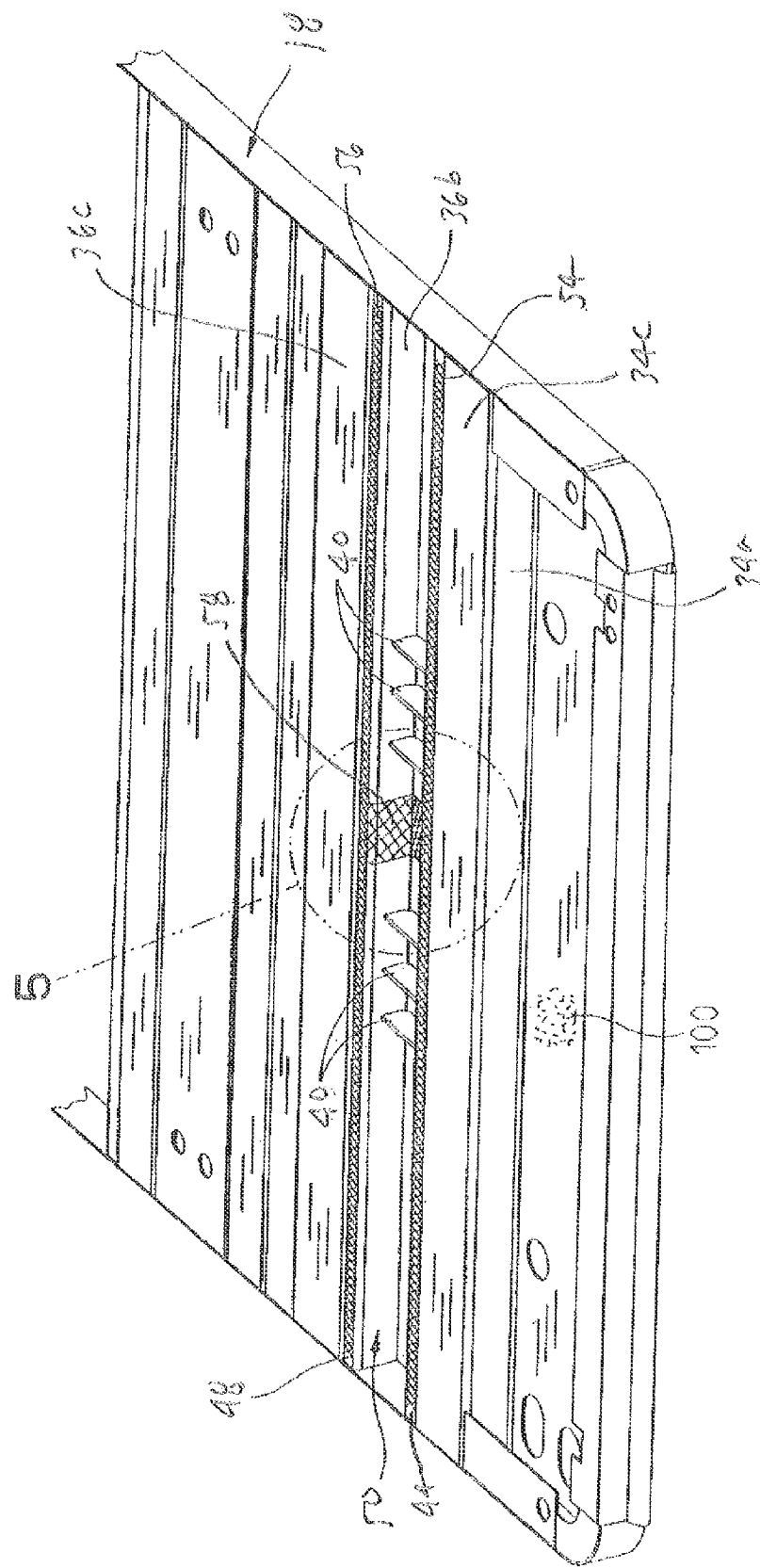
FIG. 4 is an upper perspective view of a frame of the upper coupler assembly and shown with masks for covering the frame during galvanization.

As best shown in FIGS. 2-4, the frame 18 is formed of steel and includes a pair of side bars 22, a front channel 24, a plurality of lower walls 26, 28, 30, at least a pair of bolsters 34, 36 and plurality of ribs 40. The components of the frame 18 are attached together by welding. The front channel 24 connects to an end of each side bar 22, and as such, the side bars 22 are spaced apart from each other. Each of the front channel 24 and the side bars 22 have an upper surface and a lower surface. While three lower walls 26, 28, 30 are shown, it is to be understood that more or fewer lower walls can be provided.

The lower walls 26, 28, 30 are adjacent to each other, and wall 28 is positioned between walls 26 and 30. Wall 26 is connected to the lower surfaces of the front channel 24 and the side bars 22; walls 28, 30 are connected to the lower surfaces of the side bars 22. Wall 28 has an aperture 32 therethough which receives kingpin spool 16a therethrough as described herein.

Bolsters 34, 36 are mounted on plate 28. Additional bolsters may be provided on the other plates 26, 30, if desired. The bolsters 34, 36 extend across plate 28 and are connected to side bars 22.

Figure 13:
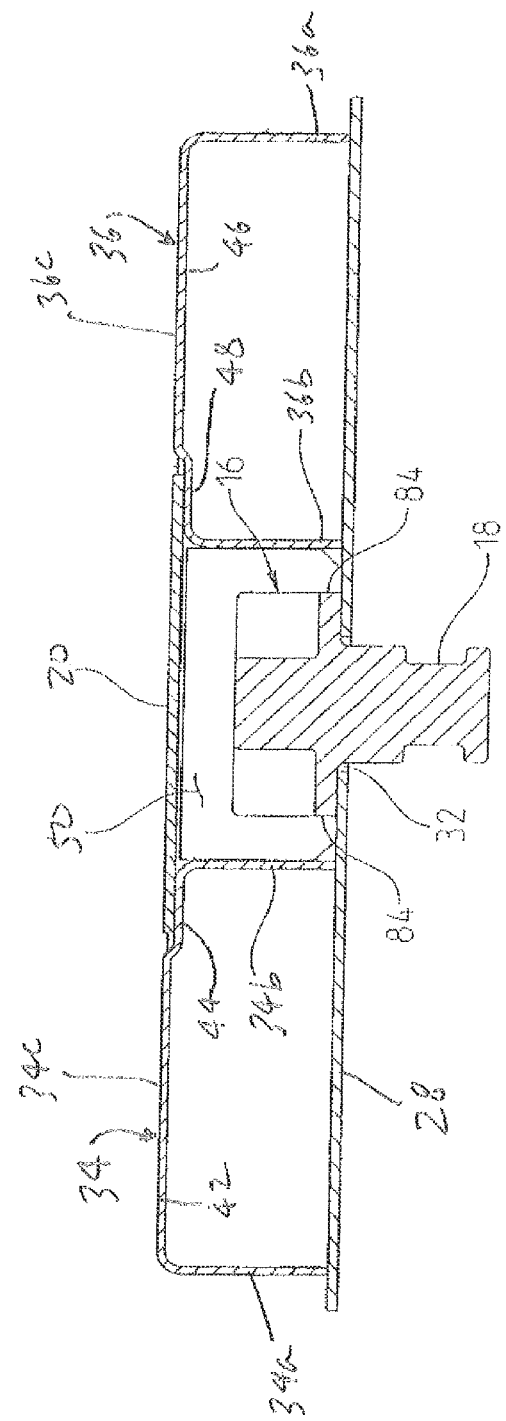
FIG. 13 is a cross-sectional view through lines 13-13 of FIG. 3.

As best shown in FIG. 13, bolster 34 has first and second spaced apart vertical walls 34a, 34b and a third horizontal wall 34c. The first and second walls 34a, 34b are attached to and extend upwardly from the plate 28 and are parallel to the front channel 24, such that the first and second walls 34a, 34b are perpendicular to the plate 28. The third horizontal wall 34c connects the first and second walls 34a, 34b at the top ends thereof The third horizontal wall 34c includes a horizontal main portion 42 and a stepped down or offset portion 44 which is horizontal, but offset from the main portion 42. The main portion 42 commences at first wall 34a and extends therefrom to the stepped down or offset portion 44. The stepped down or offset portion 44 terminates at the second wall 34b.

Bolster 36 has first and second spaced apart vertical walls 36a, 36b and a third horizontal wall 36e. The first and second walls 36a, 36b are attached to and extend upwardly from plate 28 and are parallel to the front channel 24, such that the first and second walls 36a, 36b are perpendicular to the plate 28. The third horizontal wall 36c connects the first and second walls 36a, 36b at the top ends thereof. The third horizontal wall 36c includes a horizontal main portion 46 and a stepped down- or offset portion 48 which is horizontal, but offset from the main portion 46. The main portion 46 commences at the first wall 36a and extends therefrom to the stepped down or offset portion 48. The stepped down or offset portion 48 terminates at the second wall 36b.

Walls 34b and 36b and stepped down or offset portions 44 and 48 are proximate to each other, but are spaced apart from each other. As a result, a U-shaped channel 50 is defined by walls 34b, 36b and the portion of the wall 28 provided therebetween. The aperture 32 in the wall 28 is positioned entirely between the walls 34b, 36b.

The ribs 40 conform to the shape of the channel 50 and span distance between walls 34b, 36b to rigidify the structure. The ribs 40 are attached to walls 34b, 36b and wall 28. The ribs 40 are spaced apart from each other and do not overlap the aperture 32.

The cover plate 20, if one is provided, extends over the channel 50 and is attached by suitable means, such as welding, as described herein.

A method of assembly of the upper coupler assembly 14, including the galvanization of the upper coupler assembly 14 and the attachment of kingpin 16 will now be described. It should be understood that while one embodiment of the upper coupler assembly 14 will be described, that multiple other possible embodiments exist, which could be manufactured according to the following method.

The upper coupler assembly 14 is manufactured by assembling the frame 18 as described hereinabove as shown in FIG. 4, masking portions of the frame 18, galvanizing the unmasked portions of the frame 18, and then welding the kingpin 16 and the cover plate 20 to the frame 18.

Figure 5:
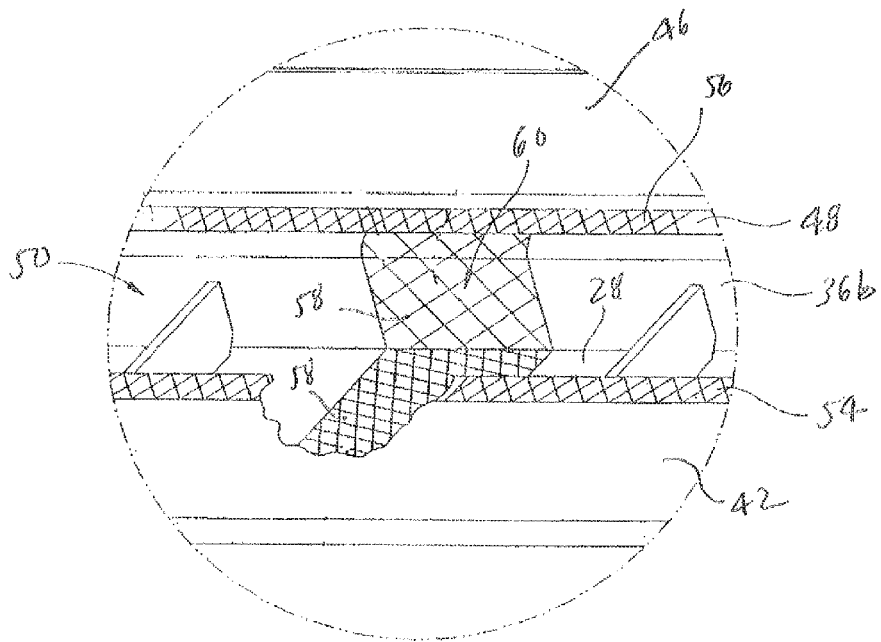
FIG. 5 is an enlarged; and partially fragmented, perspective view of the portion of the frame identified in FIG. 4.

A mask 54, which in the embodiment shown in FIGS. 4 and 5 is provided as a cover, is placed on the stepped down or offset portion 44 of the wall 34b, and a mask 56, which in the embodiment shown in FIGS. 4 and 5 is provided as a cover, is placed on the stepped down or offset portion 48 of the wall 36b. As best shown in FIGS. 4 and 5, a mask 58 may also cover a portion of the channel 50 as shown by the mask 58 covering a portion of the walls 34b, 36b and a portion of the upper surface of the wall 28. As shown in FIG. 5, this mask 58 could cover a portion of the upper surface of the wall 28 which is proximate to the aperture 32, and portions of the walls 34b, 36b which are proximate to the aperture 32. The surface defined by the mask 58 defines a kingpin receiving area 60.

Figure 6:
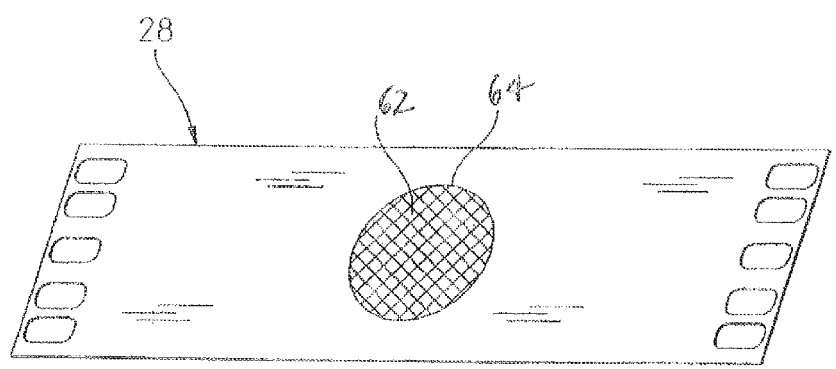
FIG. 6 is a perspective view of the lower wall with covering to protect the frame during galvanization.

As best shown in FIG. 6, an area 62 of the lower surface of the wall 28 is covered by a mask 64. The area 62 is adjacent to, and extends radially outwardly from, the aperture 32.

With the masks 54, 56, 58, 64 applied to the frame 18, the frame 18 is then galvanized according to well-known commercial means to substantially cover the frame 18 with a zinc solution plating (shown in partial form (in stippling) as galvanized coating 100 in FIG. 2), with the exception of those areas covered by masks 54, 56, 58, 64. The masks 54, 56, 58, 64 substantially impede galvanization at in the areas underneath the masks 54, 56, 58, 64. The masks 54, 56, 58, 64 can include many different forms including high temperature tape, coatings, and removable fixture structures. Possible tapes include: High Temperature Silica tape available from TPC Wire & Cable of Independence, Ohio; or High Temperature Aluminum Foil Tape 433, available from 3M™ of St. Paul, Minn. Possible coatings include: Maskote Zinc stop-off, available at ZYP Coatings, Inc., of Oak Ridge, Tenn.; High Heat Ultra Black Aerosol No. 241169 or SPECLT 1-GL 2PK (HIHEAT BAR-B-QUE BLACK) both available from Rust-Oleum Corporation of Vernon Hills, Ill.; Thurmalox® 290 Series available from Dampney Protective Coatings of Everett, Mass.; or Alvin High Temperature Paints, also available from Dampney Protective Coatings of Everett, Mass.

After galvanization, the masks 54, 56, 58, 64 are removed from the frame 18 to expose the ungalvanized steel of the frame 18 underneath the masks 54, 56, 58, 64.

Figure 7:
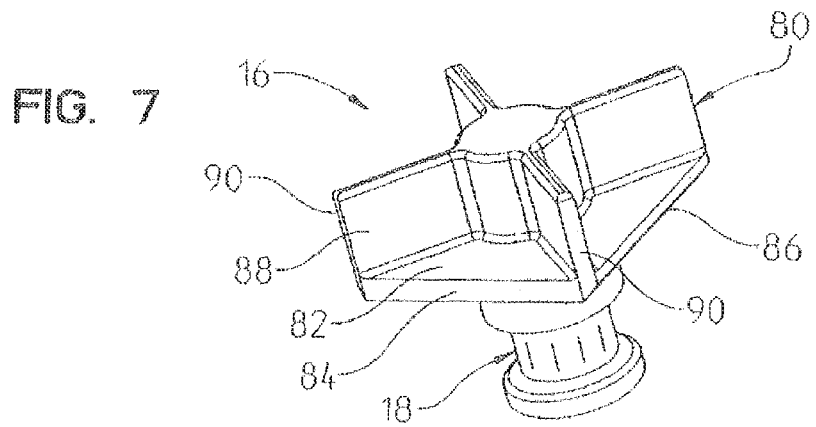
FIG. 7 is a perspective view of the kingpin.
Figure 8:
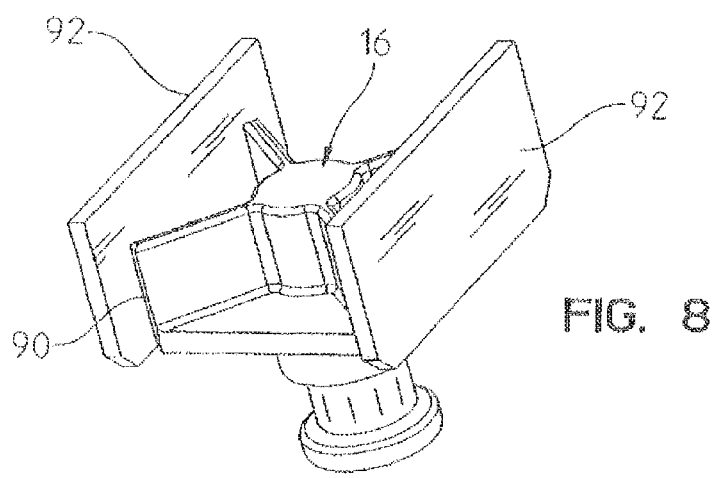
FIG. 8 is a top perspective view of the kingpin pre-welded to reinforcing ribs.
Figure 9:
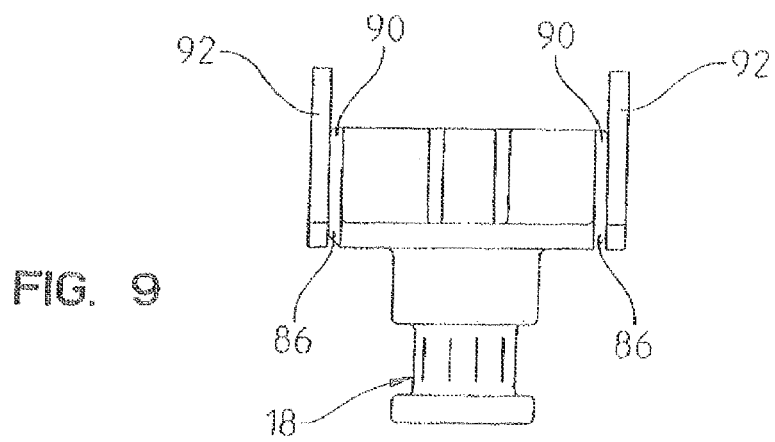
FIG. 9 is a side plan view of the kingpin and reinforcing ribs of FIG. 8.

With reference now to FIG. 7, the kingpin 16 is shown in greater detail. The kingpin 16, as in the prior art, is preferably made of alloy steel heat treated by quenching and subsequent tempering to achieve appropriate strength and wear resistance. The kingpin 16 has an upper welding block 80 attached to the spool 16a. The block 80 has a rectangular portion 82 having unbeveled edges 84 and beveled edges 86. The block 80 further includes cruciform walls 88 having edges at 90. Prior to the assembly of the kingpin 16 to the frame 18, two reinforcing ribs 92 are welded to the edges 90 of the cruciform walls 88 and along the beveled edges 86 of the rectangular portion 82. The ribs 92 are similarly configured as ribs 40 to fit within the channel 50. The ribs 92 are welded to the cruciform walls 88 and to the rectangular portion 82 by positioning a weld bead (not shown) in the gap formed between the adjacent edges of the ribs 92, the cruciform walls 88 and the rectangular portion 82.

Figure 10:
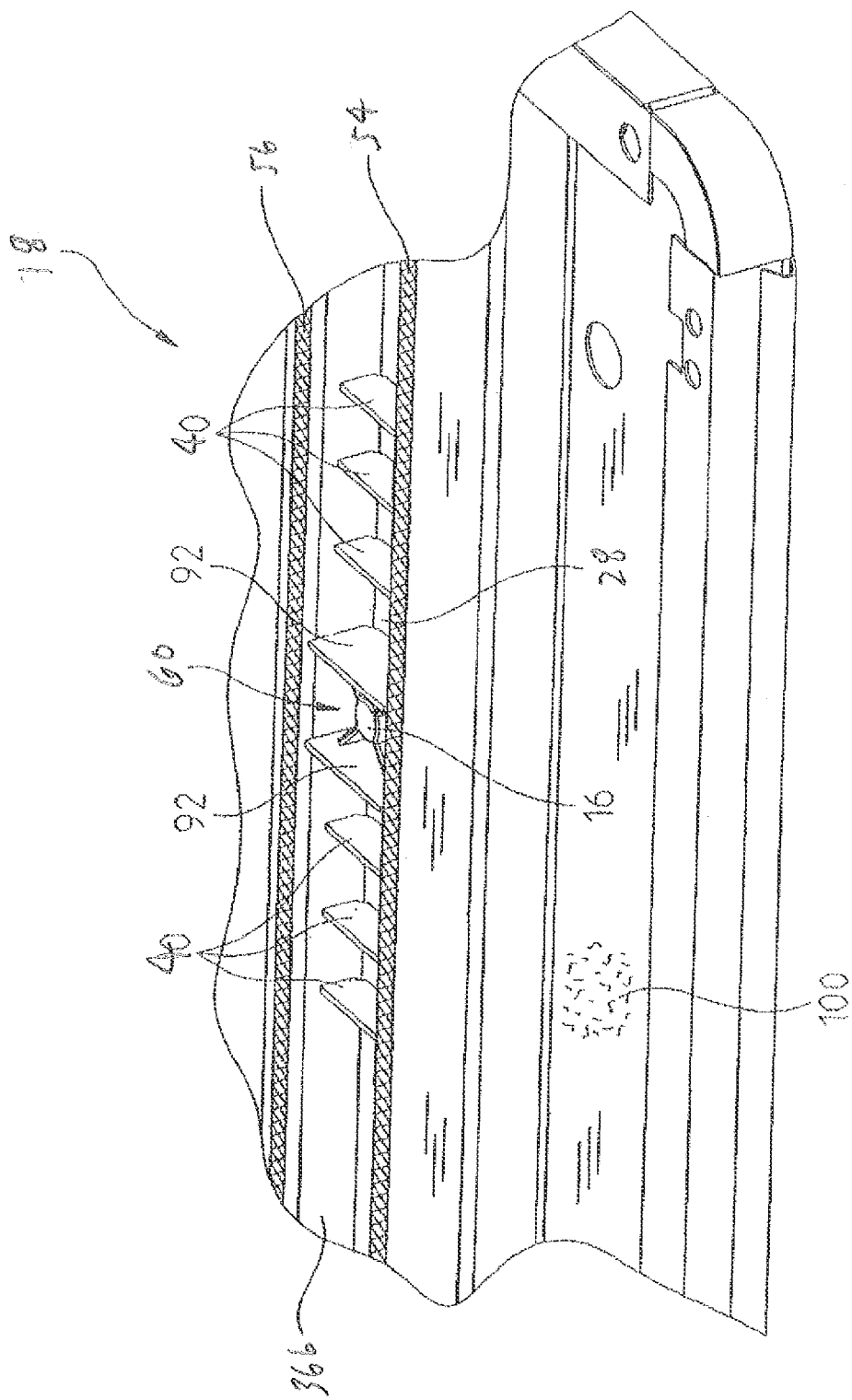
FIG. 10 is an upper perspective view of the frame having the kingpin attached thereto.
Figure 11:
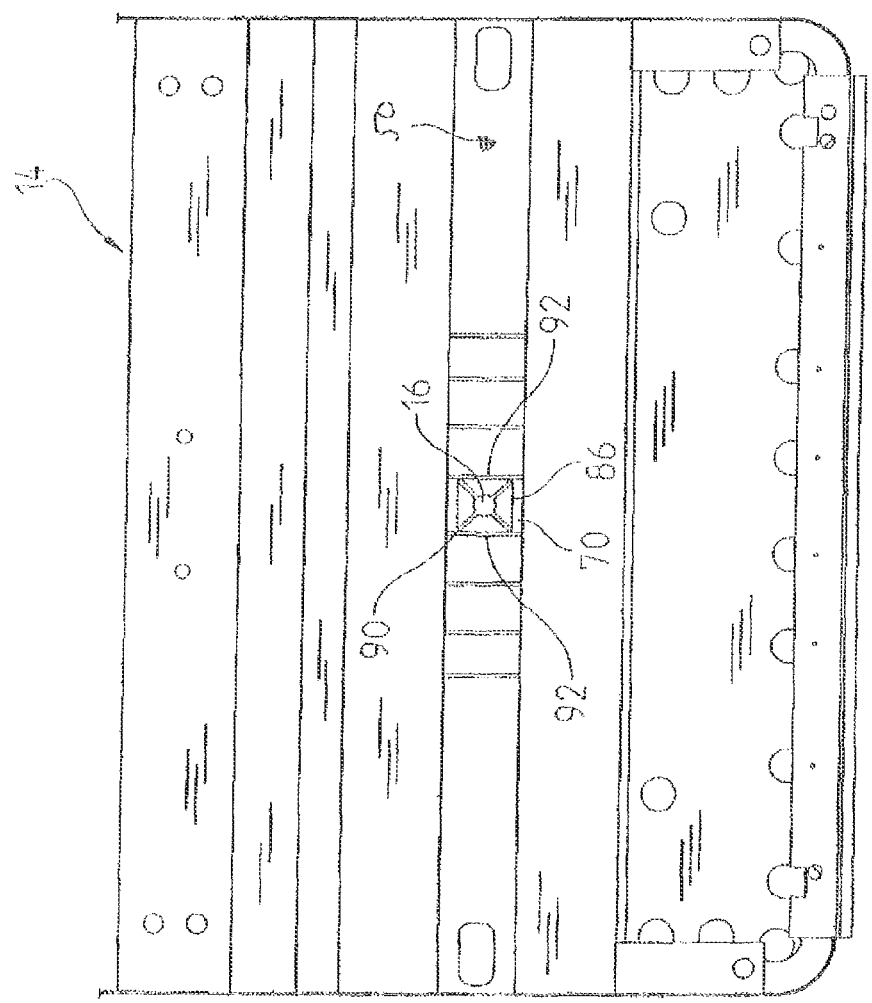
FIG. 11 is an upper plan view above the kingpin attached to the frame.

The kingpin 16 is then positioned within kingpin receiving area 60, see FIG. 10, and is attached to the frame 18, such as by welding or other fastening means (e.g. bolting or riveting or structural bonding (such as adhesives) or other well-known fastening means). The attachment takes place at the areas which were not galvanized, and may include the kingpin receiving area 60, and may include any one or all of the areas which were underneath the masks 58, 64. The kingpin 16 may be welded to walls 34*b*, 36*b* along edges 84 (FIGS. 10 and 13), while ribs 92 are welded to walls 34*b*, 36*b* and wall 28. The kingpin 16 may also be welded from an underside thereof, at the intersection of the spool 16*a* and the aperture 32, as this area is also ungalvanized: Because these surface areas are not covered with galvanizing coating 100, welding these areas also limits production of noxious and/or toxic zinc weld fumes or smoke. Welding the kingpin 16 to the frame 18 may therefore occur outside of a fume hood or other smoke protective device.

Figure 12:
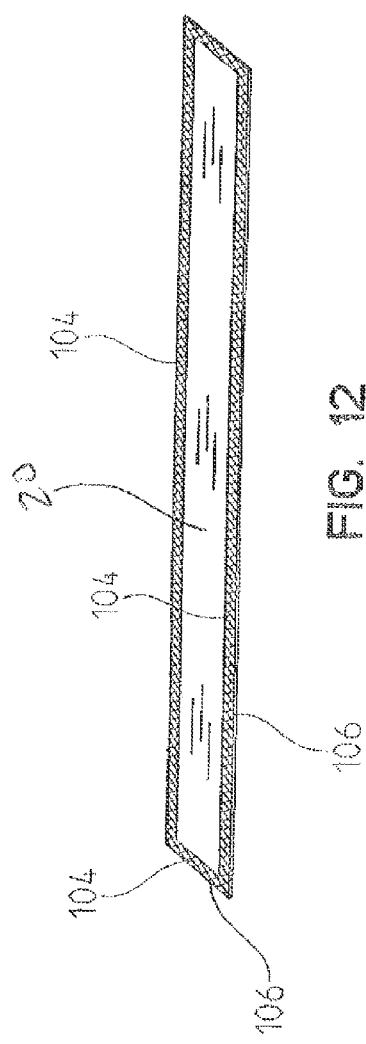
FIG. 12 is a top perspective view of a top cover plate with a mask to protect the top cover plate during galvanization.

As best shown in FIG. 12, the cover plate 20 is shaped to fit over the channel 50. The cover plate 20 is galvanized in a similar manner to that described with regard to the frame 18. The edges 106 of the cover plate 20, the upper surface of the cover plate 20 adjacent to the edges 106 and the lower surface of the cover plate 20 adjacent to the edges 106 are covered with a mask 104. Mask 104 is identical to that provided on the frame 18. Thereafter, the cover plate 20 is galvanized to provide areas covered by the galvanizing coating 100. After galvanization, the mask 104 is removed, and the edges 106 of the cover plate 20 are left uncoated by the galvanizing coating 100 and are substantially free of zinc coating.

As best shown in FIGS. 3 and 13, the cover plate 20 is welded to the frame 18 after the kingpin 16 is welded therein. The cover plate 20 is welded along stepped down or offset portions 44, 48. Since the stepped down or offset portions 44, 48 are provided, the cover plate 20 is flush with the main portions 42, 46 of the bolsters 34, 36. Welding the cover plate 20 to the frame 18 may occur outside of a fume hood or other smoke protective device. After welding the kingpin 16 and/or the cover plate 20 to the frame 18, the uncovered areas (not galvanized) may be coated with a rust resistant coating such as an epoxy paint, sulfonated wax or water emulsified asphaltic coatings, all of which are well known in the art. If the cover plate 20 is not to be provided, the stepped down or offset portions 44, 48 can be eliminated.

With reference again to FIG. 2, the ungalvanized area 62 on the lower surface of wall 28 may extend radially outward from the aperture 32, beyond that necessary for the welding process. That is, the area 62 may extend radially outward to complement the top surface of a tractor's fifth wheel (not shown). The area 62 may minimize adhesive wear, also known as galling, between galvanized coating 100 and the top surface of the tractor's fifth wheel.

Figure 14:
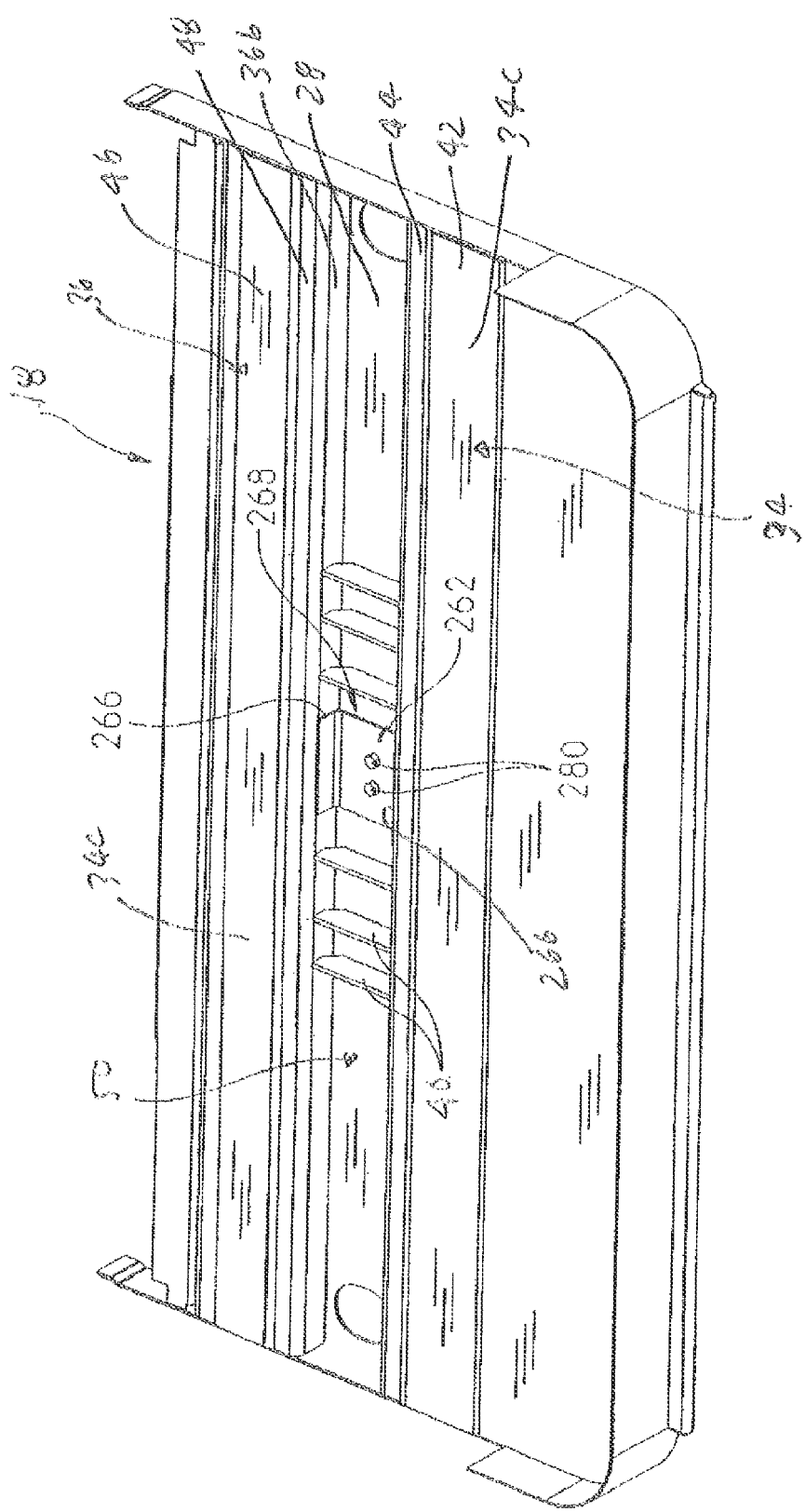
FIG. 14 is an upper perspective view of the frame with a channel fixture plate attached.
Figure 15:
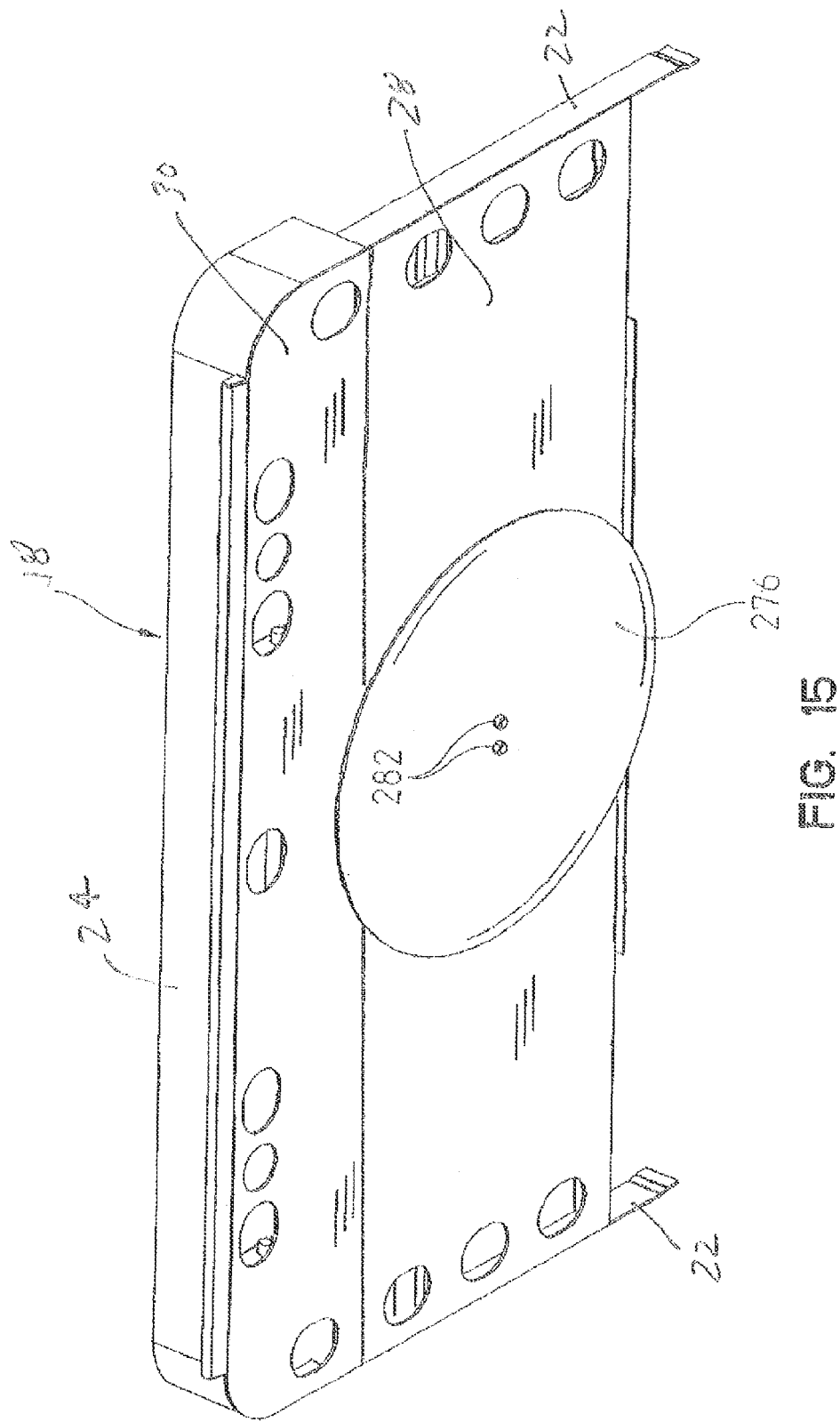
FIG. 15 is a lower perspective view of the frame with a fixture plate attached.

With reference now to FIGS. 14 and 15, an alternate mask for the channel 50 is provided in the form of a removable plate 268 and an alternate mask for the area 62 is provided in the form of a removable plate 276. The removable plate 268 is U-shaped to correspond to the shape of the channel 50 and has a base 262 which abuts the upper surface of the wall 28 and a pair of legs 266 which abut against the respective inner surfaces of the walls 34*b*, 36*b*. The removable plate 276 may be circular to provide the area 62 and abuts against the lower surface of the wall 28 or walls, for example 28, 30. The plates 268, 276 can be attached together by fasteners 280, 282 which pass through the aperture 32 and are drawn tight towards each other. As a result, wall 28 is positioned therebetween. The frame 18 is then galvanized as described above, and afterwards, the plates 268, 276 are removed, leaving the areas which were under the plates 268, 276 uncovered and without the zinc solution plating. If leakage occurs between the edges of the plates 268, 276, the tapes discussed herein can be positioned around the periphery of the plates 268, 276, and act as "seals" between the plates 268, 276 and the wall 28. Alternatively, Loctite® Marine Grade Anti-Seize (34026/IDU No. 275026) available from Henkel Corporation of Rocky Hill, Conn. 06067, could be spread over all or a portion of the surface under the plates 268, 276 to prevent any wicking of the zinc solution.

While the frame 18 is shown in a particular configuration, it would be obvious to one of ordinary skill in the art that other frame designs can be provided.

While preferred embodiments of the present invention are shown and described, it is envisioned that those skilled in the art may devise various modifications of the present invention without departing from the spirit and scope of the appended claims.

What is claimed is:

1. An upper coupler assembly of a semi-trailer for use with a lower coupler assembly of a tractor, comprising:
   a frame including a wall having an upper surface, a lower surface, and an aperture extending therethrough; and
   a kingpin received in the aperture and extending beyond the lower s ace of the wall,
   wherein the lower surface of the wall is substantially covered with a galvanizing coating, leaving a lower surface area of the lower surface uncovered by the galvanizing coating, wherein the lower surface area extends radially outward from the aperture so that the lower surface area has substantially the same dimensions as a top surface of the lower coupler assembly of the tractor, and wherein the lower surface area is coated with a rust preventative coating.

2. The upper coupler assembly of claim 1, wherein the upper surface of the wall further defines an upper surface area adjacent to the aperture, and the kingpin is welded to the frame by a first weld located within the upper surface area.

3. The upper coupler assembly of claim 2, wherein the upper surface of the wall is substantially covered with a galvanizing coating, leaving the upper surface area uncovered by the galvanizing coating of the upper surface.

4. The upper coupler assembly of claim 3, wherein the upper surface area is coated with a rust preventative coating.

5. The upper coupler assembly of claim 4, wherein the kingpin is welded to the frame by a second weld within the upper surface area.

6. The upper coupler assembly of claim 1, wherein the lower surface area is substantially circular in shape.

7. An upper coupler assembly of a semi-trailer for use with a lower coupler assembly of a tractor, comprising:
   a frame including a wall having an upper surface, a lower surface, and an aperture extending therethrough; and
   a kingpin received in the aperture and extending beyond the lower surface of the wall,
   wherein the upper surface defines an upper surface area adjacent to the aperture and wherein the lower surface defines a lower surface area adjacent to the aperture, and
   wherein the lower surface of the wall is substantially covered with a galvanizing coating, leaving the lower surface area uncovered by the galvanizing coating, wherein the lower surface area is coated with a rust preventative coating, and wherein the lower surface area extends outward of the aperture to complement a top surface of the lower coupler assembly of the trailer.

8. The upper coupler assembly of claim 7, wherein the kingpin is welded to the frame by a first weld located within the upper surface area.

9. The upper coupler assembly of claim 8, wherein the kingpin is welded to the frame by a second weld located within the lower surface area.

10. The upper coupler assembly of claim 9, wherein the upper surface area is coated with a rust preventative coating.

11. The upper coupler assembly of claim 7, wherein the frame further includes a channel proximate to the aperture and the kingpin is welded to the frame within the channel.

12. The upper coupler assembly of claim 7, wherein the kingpin is attached to the frame by one of bolting, riveting, structural bonding and welding.

13. An upper coupler assembly of a semi-trailer for use with a lower coupler assembly of a tractor, comprising:
    a frame including a wall having an upper surface and a lower surface including a lower surface area; and
    a pivoting joint disposed between the trailer and the tractor, wherein the lower surface area of the lower surface comprises an area of contact between the lower surface of the wall and the lower coupler assembly as the trailer is pivoted about the pivoting joint relative to the tractor, wherein the lower surface of the wall is substantially covered with a galvanizing coating, leaving the lower surface area uncovered by the galvanizing coating, and the lower surface area extends radially outward from the pivoting joint.

14. The upper coupler assembly of claim 13, wherein the lower surface area is coated with a rust preventative coating.

15. The upper coupler assembly of claim 13, further comprising:
    an aperture defined through the wall; and
    a kingpin received in the aperture, the kingpin being a portion of the pivoting joint.

16. The upper coupler assembly of claim 15, wherein the wall further defines an upper surface area of the upper surface adjacent to the aperture, and the kingpin is welded to the frame by a first weld located within the upper surface area.

17. The upper coupler assembly of claim 16, wherein the upper surface of the wall is substantially covered with a galvanizing coating, leaving the upper surface area uncovered by the galvanizing coating of the upper surface.

18. The upper coupler assembly of claim 17, wherein the upper surface area is coated with a rust preventative coating.

19. The upper coupler assembly of claim 16, wherein the kingpin is welded to the frame by a second weld located within the lower surface area.

20. The upper coupler assembly of claim 13, wherein the lower surface area is substantially circular in shape.

21. A semi-trailer for use with a tractor, comprising:
    a trailer floor assembly;
    wheels attached to the floor assembly at a rearward section of the trailer; and
    an upper coupler assembly having a wall having an upper surface and a lower surface, wherein the upper coupler assembly lower surface is galvanized except for a lower surface area of the lower surface, and wherein the lower surface area comprises an area of contact at the lower surface by a lower coupler assembly of the tractor when the trailer is attached to the tractor at the lower coupler assembly.

22. The trailer of claim 21, further comprising a kingpin attached to the wall.

23. The trailer of claim 22, wherein the kingpin is welded to the wall.

24. The trailer of claim 23, wherein an upper surface area is defined on the upper surface of the wall at an intersection of the kingpin and the wall, and the kingpin is welded to the wall by a first weld located within the upper surface area.

25. The trailer of claim 21, wherein a rust preventative coating is applied to the lower surface area.

26. The trailer of claim 21, wherein the lower surface area is substantially circular in shape.

27. A semi-trailer for use with a tractor, comprising:
    a trailer floor assembly;
    wheels attached to the floor assembly at a rearward section of the trailer;
    an upper coupler assembly having a wall having an upper surface and a lower surface; and
    a kingpin attached to the wall and extending beyond the lower surface,
    wherein the upper coupler assembly lower surface is galvanized except for a lower surface area of the lower surface, and wherein the lower surface area extends outward of the kingpin to comprise an area of contact between the lower surface of the wall and a lower coupler assembly of the tractor.

28. The trailer of claim 27, wherein the kingpin is welded to the wall.

29. The trailer of claim 28, wherein an upper surface area is defined on the upper surface of the wall at an intersection of the kingpin and the wall, and the kingpin is welded to the wall by a first weld located within the upper surface area.

30. The trailer of claim 27, wherein a rust preventative coating is applied to the lower surface area.

\* \* \* \* \*